United States Patent
Hirano et al.

(10) Patent No.: US 8,434,814 B2
(45) Date of Patent: May 7, 2013

(54) JOINING MECHANISM

(75) Inventors: Kiyotaka Hirano, Hamamatsu (JP); Yuki Satake, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 187 days.

(21) Appl. No.: 13/031,237

(22) Filed: Feb. 20, 2011

(65) Prior Publication Data

US 2011/0210574 A1    Sep. 1, 2011

(30) Foreign Application Priority Data

Feb. 26, 2010   (JP) ................................. 2010-042934

(51) Int. Cl.
*B62D 25/08* (2006.01)

(52) U.S. Cl.
USPC ................................. 296/193.09; 296/203.02

(58) Field of Classification Search ............. 296/193.01, 296/193.09, 193.1, 203.02; 180/68.4, 68.6
See application file for complete search history.

(56) References Cited

U.S. PATENT DOCUMENTS

| | | | |
|---|---|---|---|
| 4,940,281 A * | 7/1990 | Komatsu | 296/193.09 |
| 6,357,821 B1 * | 3/2002 | Maj et al. | 296/193.09 |
| 6,955,393 B2 * | 10/2005 | Staargaard et al. | 296/193.1 |
| 6,979,053 B2 * | 12/2005 | Kim | 296/193.09 |
| 7,331,413 B2 * | 2/2008 | Okai et al. | 180/68.4 |
| 7,419,208 B2 * | 9/2008 | Sub | 296/193.09 |
| 7,845,714 B2 * | 12/2010 | Fischer et al. | 296/193.09 |
| 7,914,071 B2 * | 3/2011 | Saitou et al. | 296/193.09 |
| 8,191,959 B2 * | 6/2012 | Ritz | 296/187.09 |
| 2004/0155486 A1 | 8/2004 | Uchiyama | |
| 2010/0213742 A1 * | 8/2010 | Ritz | 296/193.09 |
| 2011/0210574 A1 * | 9/2011 | Hirano et al. | 296/29 |

FOREIGN PATENT DOCUMENTS

JP         2002-120760 A        4/2002

* cited by examiner

*Primary Examiner* — Glenn Dayoan
*Assistant Examiner* — Gregory Blankenship
(74) *Attorney, Agent, or Firm* — Silicon Valley Patent Group LLP (57) ABSTRACT

A joining mechanism includes a front lower cross member 110 formed from a front plate 112 and a back plate 114 joined together to form a space, the front lower cross member 110 extending in a vehicle width direction lower than a hood lock member 108 which supports a bottom part of the vicinity of a front end of an engine hood 104, and a hood lock brace 120 which extends in a vehicle height direction between the hood lock member 108 and the front lower cross member 110, the hood lock brace 120 joining the hood lock member 108 and the front lower cross member 110, wherein upper end vicinities of the front plate 112 and the back plate 114 of the front lower cross member 110 are fastened to the front side of the hood lock brace 120, and the upper end surface 112j of the front plate 112 and the upper end surface 114j of the back plate 114 are separated from the hood lock brace 120.

9 Claims, 8 Drawing Sheets

SECTION A-A

SECTION D-D

*FIG. 8C*

JOINING MECHANISM

CROSS REFERENCE TO RELATED APPLICATIONS

This application is based upon and claims the benefit of priority from the prior Japanese Patent Application No. 2010-042934, filed on Feb. 26, 2010, the entire contents of which are incorporated herein by reference.

BACKGROUND OF THE INVENTION

1. Field of the Invention

The present invention relates to a joining mechanism which joins a front lower cross member and a hood lock brace which are arranged on the front part of a vehicle.

2. Background of the Invention

An engine hood (also called a bonnet) is arranged on the front part of a vehicle in order to cover the engine arranged inside, and a hood lock member which extends in a vehicle width direction is arranged for supporting the lower part of the front end vicinity of this engine hood. A front lower cross member which forms a structural body of the front part of the vehicle, extends in a vehicle width direction to the lower part of the hood lock member. In addition, a hood lock brace which extends in a vehicle height direction is arranged between the hood lock member and the front lower cross member and joins together the hood lock member and the front lower cross member.

The front lower cross member described above is usually formed from two plates arranged front and back or two plates arranged up and down and an enclosed space is formed by joining the two plates. For example, in Japanese Laid Open Patent 2002-120760 (patent document 1), a front lower cross member (also called a front end cross member) is formed from a first part and a second part arranged next to each front and back and an enclosed space is formed from this structure.

SUMMARY

While a front grill etc is arranged on the front surface, that is, front bumper of a vehicle, rain water (simply called "water" below) is blown through the gaps of the grill and sometimes reaches a hood lock brace when the vehicle is driving in wet weather. The water on the hood lock brace falls down onto the bottom part. Then, in the conventional structure described in the patent document 1, this water arrives at the upper end surface of the front lower cross member (that is, the upper end surface of the two plates) which is joined to the lower part of the hood lock brace, and accumulates. As a result, in the conventional structure, the problem occurs whereby rust is easily formed on the upper end surface of the front lower cross member.

In addition, when water accumulates on the upper end surface of the front lower cross member, it becomes easy for this water to enter the enclosed space within the front lower cross member from the matching surfaces of the two parts. As a result, the problem arises whereby the possibility of rust being formed within the front lower cross member is significantly increased.

The present invention attempts to solve the problems described above by providing a joining mechanism which can reduce the formation of rust on an upper end surface of and within a front lower cross member by preventing water accumulating on the upper end surface of the front lower cross member.

In order to solve the problems described above, a representative structure of the joining mechanism related to the present invention includes a front lower cross member formed from a front plate and a back plate joined together to form a space, the front lower cross member extending in a vehicle width direction lower than a hood lock member which supports a bottom part of the vicinity of a front end of an engine hood, and a hood lock brace which extends in a vehicle height direction between the hood lock member and the front lower cross member, the hood lock brace joining the hood lock member and the front lower cross member, wherein upper end vicinities of the front plate and the back plate of the front lower cross member are fastened to the front side of the hood lock brace, and the upper end surface of the front plate and the upper end surface of the back plate are separated from the hood lock brace.

According to the structure described above, because the upper end surface of the front plate and the upper end surface of the back plate, that is, the upper end surface of the front lower cross member and the hood lock brace, do not contact, water which flows off the hood lock brace does not reach the upper end surface. Therefore, water does not accumulate on the upper end surface, and it is possible to reduce the formation of rust on the upper end surface. In addition, because water does not accumulate on the upper end surface, water is prevented from entering the inside of the front lower cross member and it is possible to reduce the formation of rust inside of the front lower cross member.

The hood lock brace may be provided with a seat part which expands towards the front lower cross member and is joined to the front lower cross member, and the seat part may be positioned lower than the upper end surface of the back plate.

With this structure, the upper end surface of the front plate and the upper end surface of the back plate are separated from the hood lock brace by the seat part. In addition, because the seat part is positioned lower than the upper end surface of the back plate, the water transferred by the hood lock brace does not contact the upper end surface of the back plate and is transferred by the seat part. Therefore, it is possible to prevent water accumulating on the upper end surface and obtain the effects described above. In addition, by expanding the seat part a gap is formed between a part of the seat part periphery of the hood lock brace and the front lower cross member. In this way, because water which reaches the seat part flows downwards via both sides of the seat part, it is possible to accelerate water drainage near the vicinity of the joined parts.

The front plate described above extends upwards further than the upper end of the back plate and the upper end of the front plate may curve towards back side.

According to this structure, because the front plate is positioned above the matching surface of the front plate and the back plate, even in the case where water is blown into the interior of a vehicle, it is possible to prevent water entering from the matching surface. In addition, because the upper end of the back plate is covered by the front plate, even assuming a case where rust is formed on an interior surface of the upper end of the back plate, it is difficult to see the rust and therefore it is possible to maintain the external appearance of the vehicle.

The front plate and the back plate described above may curve towards front side at the position upper than the joining part with the hood lock brace. Even with this structure, because it is possible to separate the upper end surface of the front plate and the back plate from the hood lock brace, it is possible to prevent water accumulating on the upper end surface of the front plate and the back plate and obtain the effects described above.

The front plate described above extends upwards further than the upper end of the back plate and the upper end of the front plate may curve towards back side in order to cover the upper end of the back plate. In this way, because the front plate is positioned on the front and upper part of the matching surface of the front plate and the back plate, it is possible to prevent water from entering from the matching surface. In addition, similarly, even assuming a case where rust is formed on an interior surface of the upper end of the back plate, it is difficult to see the rust and therefore it is possible to maintain the external appearance of the vehicle.

The lower end of the hood lock brace described above may curve towards back side in order to be separated from the back plate. In this way, the water transferred by the hood lock brace drips down onto the lower end. Therefore, water drainage improves at the lower end of the hood lock brace and rust can be prevented from being formed.

A gap part can be arranged on the opposing surfaces of the front plate and the back plate at a part other than those welded or fastened. In the case where the opposing surfaces of the front plate and the back plate are in contact, when water enters the contact surface, it accumulates over a long period of time because drainage is difficult making it easier for rust to form. Therefore, it is possible to reduce the contact surface between the front plate and the back plate by arranging a gap and it is possible to reduce the range where rust is formed.

The front plate described above may extend downwards further than the lower end of the back plate. With this structure, even if rust forms on the interior surface of the lower end of the back plate, this lower end is covered by the front plate. Therefore, it is difficult to see the rust and therefore it is possible to maintain the external appearance of the vehicle.

According to the present invention, it is possible to reduce the formation of rust on an upper end surface and interior of a front lower cross member by preventing the accumulation of water on the upper end surface of the front lower cross member.

BRIEF DESCRIPTION OF THE DRAWINGS

Embodiments of the invention will be described, by way of example only, with reference to the drawings.

DETAILED DESCRIPTION OF THE INVENTION

The preferred embodiments of the present invention are explained in detail below while referring to the attached diagrams. The dimensions, materials and other specific numerical values are simply for exemplifying easy understanding of the invention and do not limit the invention. Furthermore, in the description of the invention and diagrams, overlapping explanations are omitted by attaching the same symbols to elements having essentially the same function and/or structure and elements which are not directly related to the present invention are omitted from the diagrams.

First Embodiment

Figure 1A:
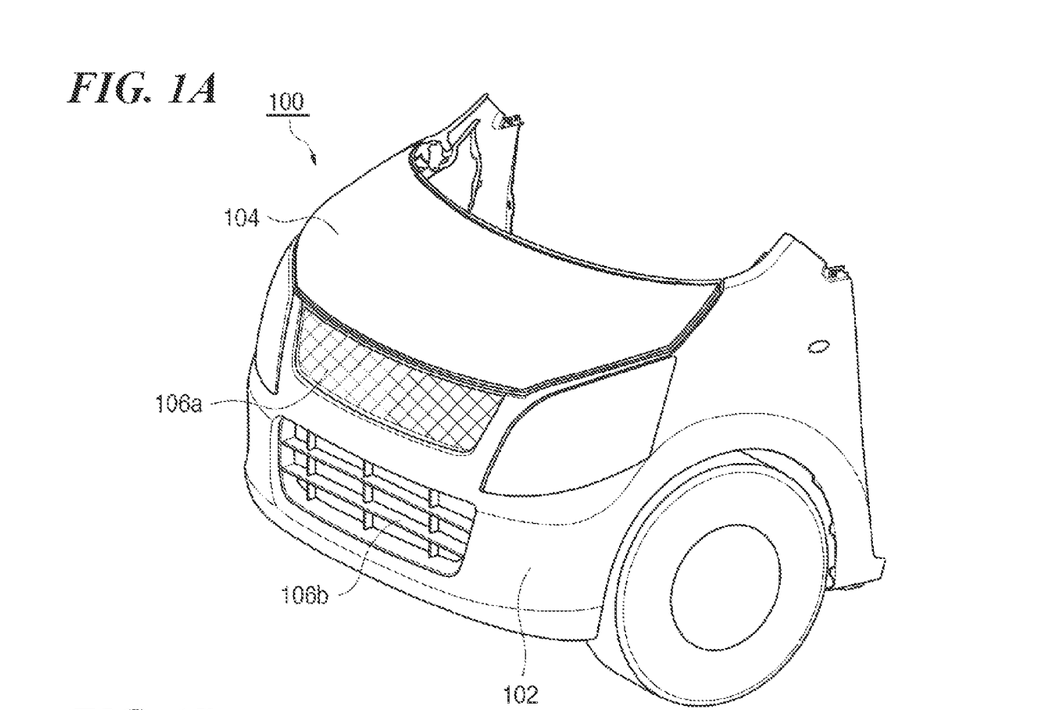
FIGS. 1A and 1B are diagrams which show an approximate structure of the front part of a vehicle body arranged with a joining mechanism related to a first embodiment.
Figure 1B:
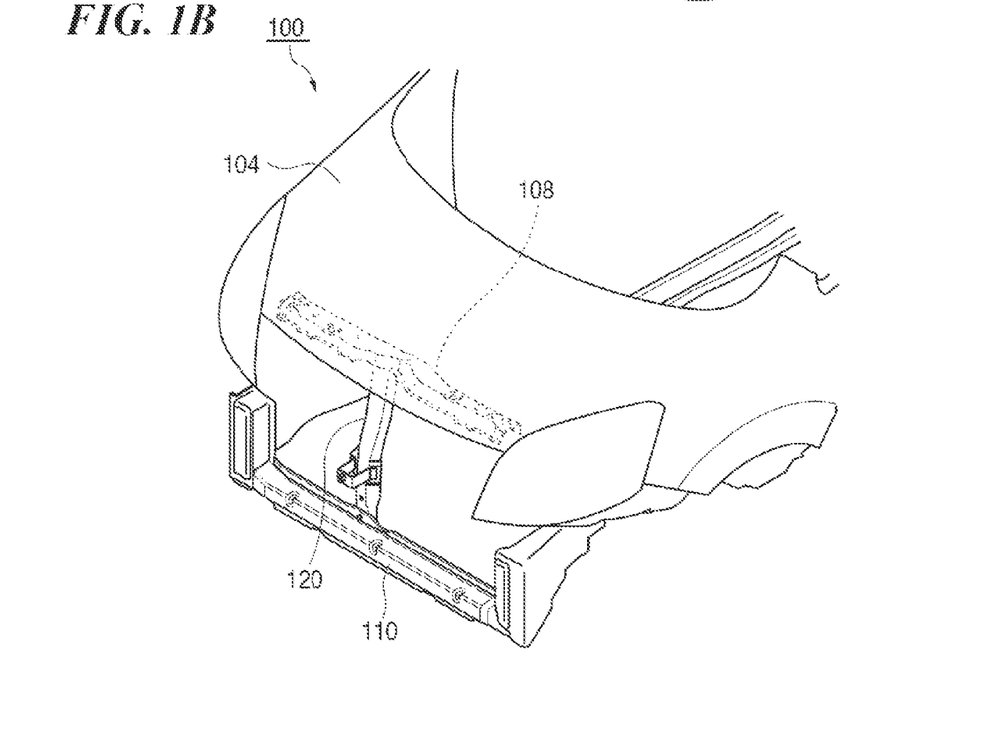

FIGS. 1A and 1B are diagrams which show an approximate structure of the front part of a vehicle body 100 arranged with a joining mechanism related to a first embodiment. FIG. 1A is a perspective view of the exterior of the front part of the vehicle body 100, FIG. 1B is a perspective view which shows a structure of the interior of FIG. 1A. Furthermore, in FIGS. 1A and 1B, detailed views of parts which are unnecessary for explaining the joining mechanism related to the present embodiment are omitted to facilitate easier explanation of the invention.

As is shown in FIG. 1A, the exterior covering of the front part of the vehicle body 100 is formed mainly from a front bumper 102, and an engine hood 104 which covers an engine (not shown in the diagram) installed within the front part of the vehicle body 100, is arranged above the front bumper 102. In addition, the front of the front bumper 102 is arranged with a front grill formed from a front upper grill 106a and a front lower grill 106b.

As is shown in FIG. 1B, hood lock member 108 which supports the lower part of the front end vicinity of the engine hood 104 extends in a vehicle width direction in the interior of the front part of the vehicle body 100. A front lower cross member 110 which becomes a structure body of the front of the vehicle body 100 extends in a vehicle width direction on the lower part of the hood lock member 108. In addition, a hood lock brace 120 which extends in a vehicle height direction is arranged between the hood lock member 108 and the front lower cross member 110. By joining the hood lock member 108 and the front lower cross member 110 to the hood lock brace 120, they become connected via the hood lock brace 120.

When the vehicle body 100 is driving during rainy weather, water is blown through the gaps of the front grill (front upper grill 106a and front lower grill 106b) and sometimes reaches the hood lock brace 120. In this case, this water falls down via the hood lock brace 120 and arrives at the front lower cross member 110 which is joined to the lower part of the hood lock brace 120. In the present embodiment, a joining mechanism of the front lower cross member 110 and hood lock brace 120 is explained which can prevent water from accumulating on the upper end surface of the front lower cross member 110, and reduce the formation of rust.

Figures 2A, 2B:
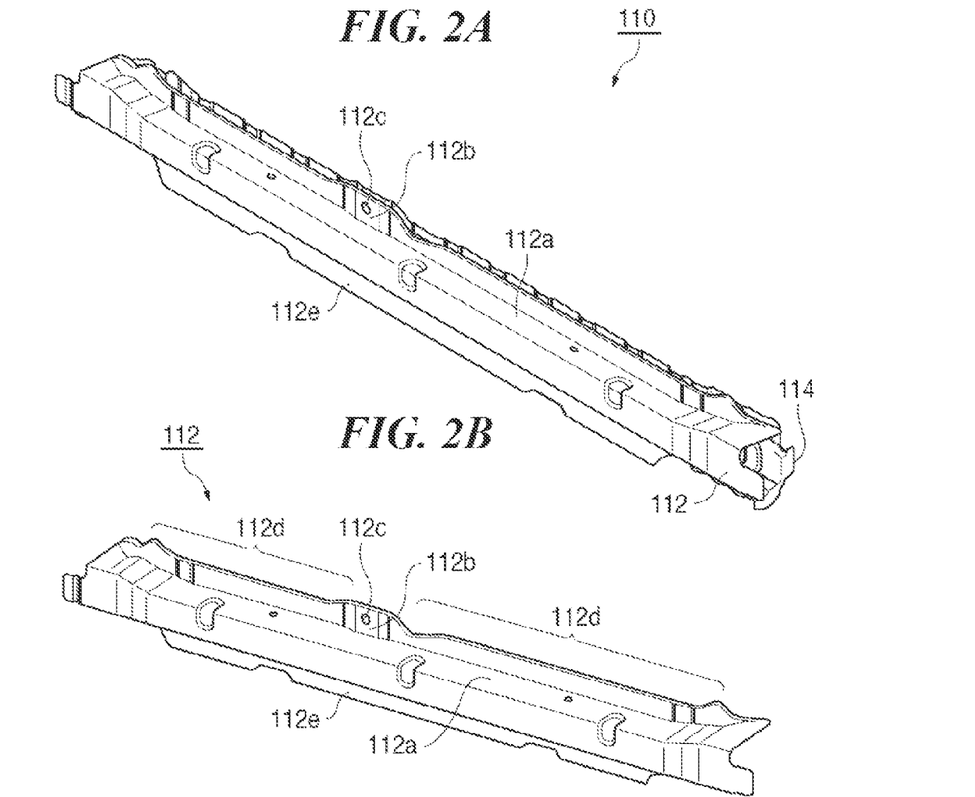
FIGS. 2A, 2B and 2C are diagrams which show an approximate structure of a front lower cross member in FIGS. 1A and 1B.

FIGS. 2A, 2B and 2C are diagrams which show an approximate structure of the front lower cross member 110 in FIGS. 1A and 1B. FIG. 2A is an external perspective view of the front lower cross member 110. As is shown in FIG. 2A, the front lower cross member 110 is formed from a front plate 112 and a back plate 114 arranged next to each other, and a space is formed by joining the front plate 112 and the back plate 114 together.

FIG. 2B is an external perspective view of the front plate 112. As is shown in FIG. 2B, the front plate 112 forms a front surface and an upper surface of a space of the front lower cross member 110 by a curved surface 112a. A joining part 112b which is joined to the hood lock brace 120 via a joining part 114b of the back plate 114 is arranged at roughly the center of the front plate 112 in a vehicle width direction, and a bolt hole 112c is formed in the joining part 112b. An upper flange 112d is assembled from one end of a curved surface 112a on both sides of the joining part 112b, and a lower flange 112e is assembled from the other end of the curved surface 112a.

Figure 2C:
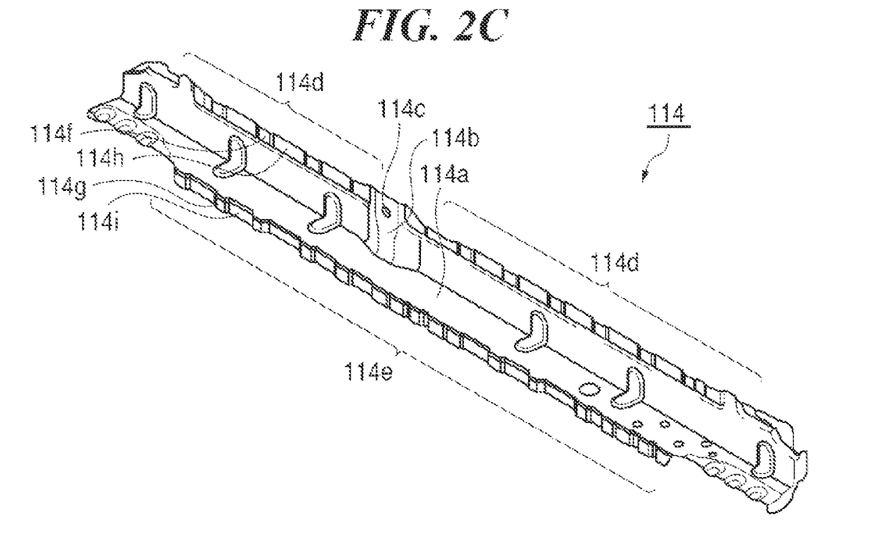

FIG. 2C is an external perspective view of the back plate 114. As is shown in FIG. 2C, the back plate 114 forms a back surface and a lower surface of a space of the front lower cross member 110 by a curved surface 114a. A joining part 114b which is joined to the hood lock brace 120 is arranged at roughly the center of the back plate 114 in a vehicle width direction, and a bolt hole 114c is formed in the joining part 114b. An upper flange 114d is assembled from one end of a curved surface 114a on both sides of the joining part 114b, and a lower flange 114e is assembled from the other end of the curved surface 114a.

A contact part 114f and a contact part 114g which contact with the upper flange 112d or lower flange 112e of the front plate 112 is arranged at a certain position on the upper flange 114d and lower flange 114e of the back plate 114. In this way, the front plate 112 and the back plate 114 are brought into contact, the contact parts 114f and 114g are spot welded, and it is possible to assemble the front lower cross member 110 as is shown in FIG. 2A. Furthermore, the contact parts 114f and 114g do not all have to be spot welded but can be joined together using other components (not shown in the diagram).

In the present embodiment, a non contact part 114h and 114i which recede further back in a vehicle length direction than the contact part 114f or 114g, are formed between adjacent contact parts 114f and 114g. In this way, when the front lower cross member 110 is assembled, a gap 118a and a gap 118b are formed between the upper flange 112d and the upper flange 114d and between the lower flange 112e and 114e respectively (see FIGS. 6A and 6B). The gap 118a and 118b are explained in detail below.

Furthermore, in the present embodiment, the contact part 114f and 114g and the non contact part 114h and 114i are arranged on the upper flange 114d and lower flange 114e of the back plate 114. However, the structure is not limited to this. For example, a contact part and non-contact part may be arranged on the flange of the front plate 112 or on both flanges of the front plate 112 and the back plate 114.

In addition, in the present embodiment, a space in the contact part 114f of the upper flange 114d of the back plate 114 is depressed and the non-contact part 114h is receded, the contact part 114g of the lower flange 114e is projected out and the non-contact part 114i is relatively receded. However, the structure is not limited to this. Either method can be used to form the non-contact part 114h or 114i.

Figure 3A:
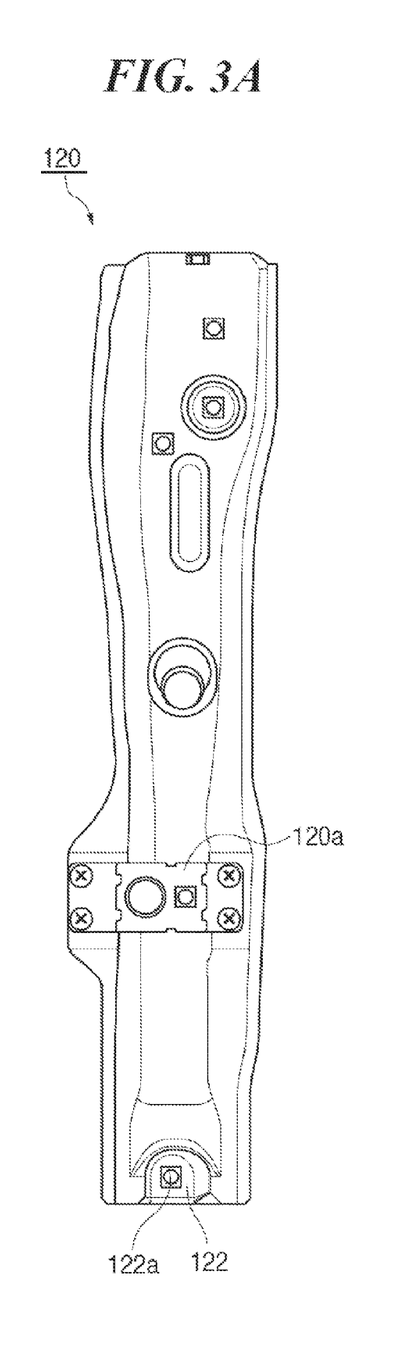
FIGS. 3A and 3B are diagrams which show an approximate structure of a hood lock brace in FIGS. 1A and 1B.
Figure 3B:
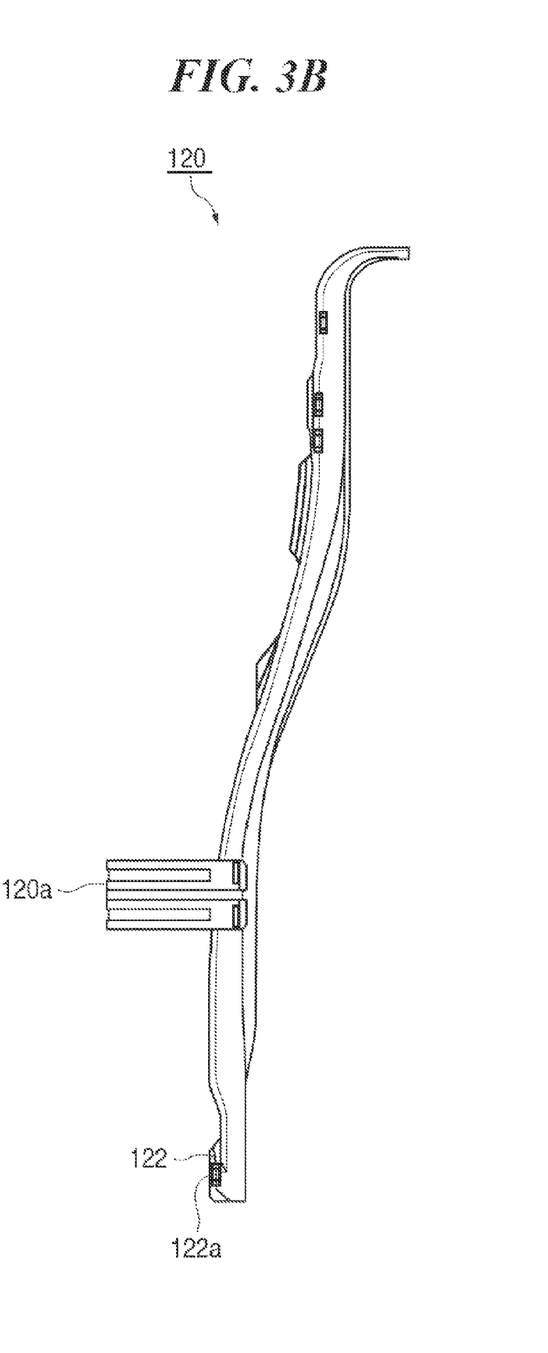

FIGS. 3A and 3B are diagrams which show an approximate structure of the hood lock brace 120 in FIGS. 1A and 1B. FIG. 3A is a front surface view of the hood lock brace 120, FIG. 3B is a side surface view of the hood lock brace 120. Not only are the hood lock member 108 and the front lower cross member 110 attached to the hood lock brace 120 but also a front bumper bracket 120a. The front bumper 102 is joined via the front bumper bracket 120a and a hood lock (not shown in the diagram) which acts as a lock of the engine hood 104 may also be arranged.

In the present embodiment, the hood lock brace 120 includes a seat part 122 which expands towards the front of the vehicle, that is, towards the front lower cross member side and is joined to the front lower cross member 110. A bolt hole 122a is formed in the seat part 122. With this structure, when the joining parts 112b and 114b of the front lower cross member 110 are joined to the seat part 122, the front lower cross member 110, in particular the back plate 114 and the hood lock brace 120 are separated upwards further than the seat part 122.

Figure 4A:
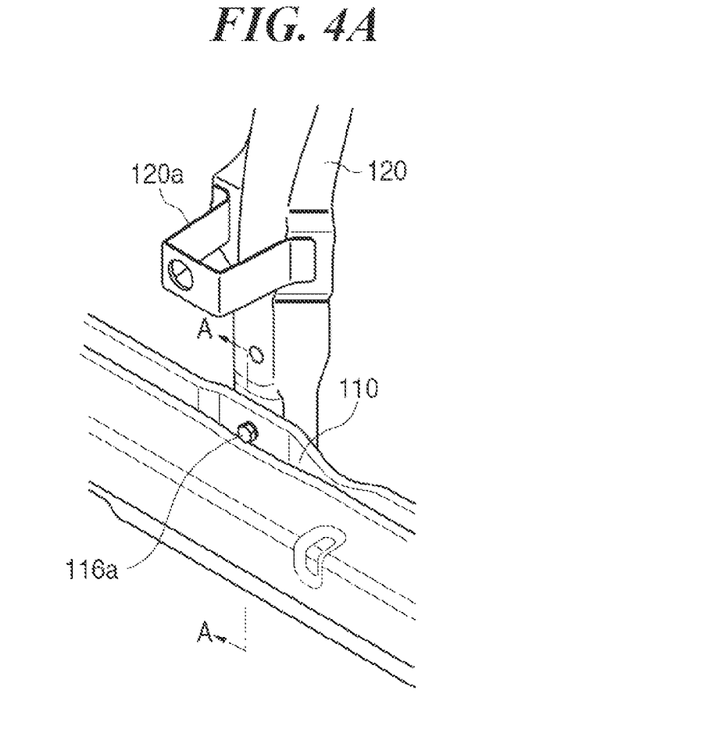
FIGS. 4A and 4B are enlarged diagrams of the vicinity of a joining part between the front lower cross member and the hood lock brace in FIG. 1B.
Figure 4B:
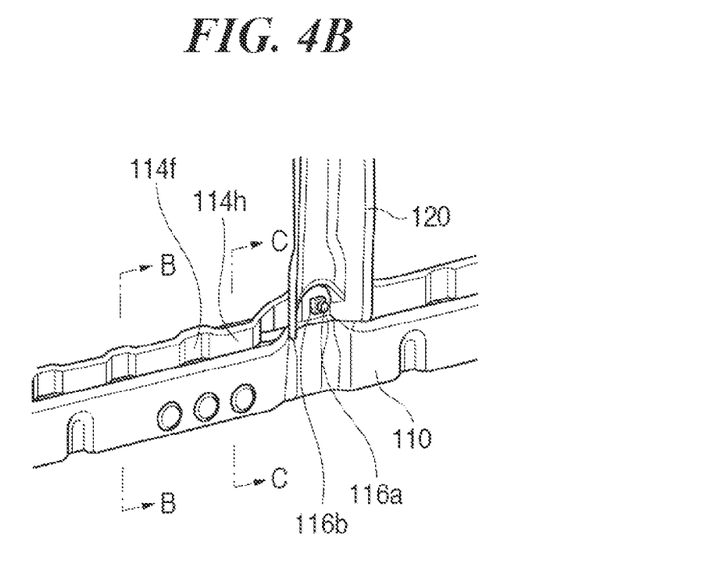

FIGS. 4A and 4B are enlarged diagrams of the vicinity of a joining part between the front lower cross member and the hood lock brace in FIG. 1B. FIG. 4A is a front surface expanded view of the vicinity of the joining part and FIG. 4B is a back surface view of FIG. 4A. When the front lower cross member 110 and hood lock brace 120 are joined, first the joining parts 112b and 114b which are arranged in the vicinity of the upper end of the assembled front lower cross member 110, are brought into contact with front side of the seat part 122 of the hood lock brace 120. In addition, the state shown in FIGS. 4A and 4B is achieved by inserting a bolt 116a into the bolt hole 112c, 114c and 122a and tightening by a nut 116b.

Figure 5A:
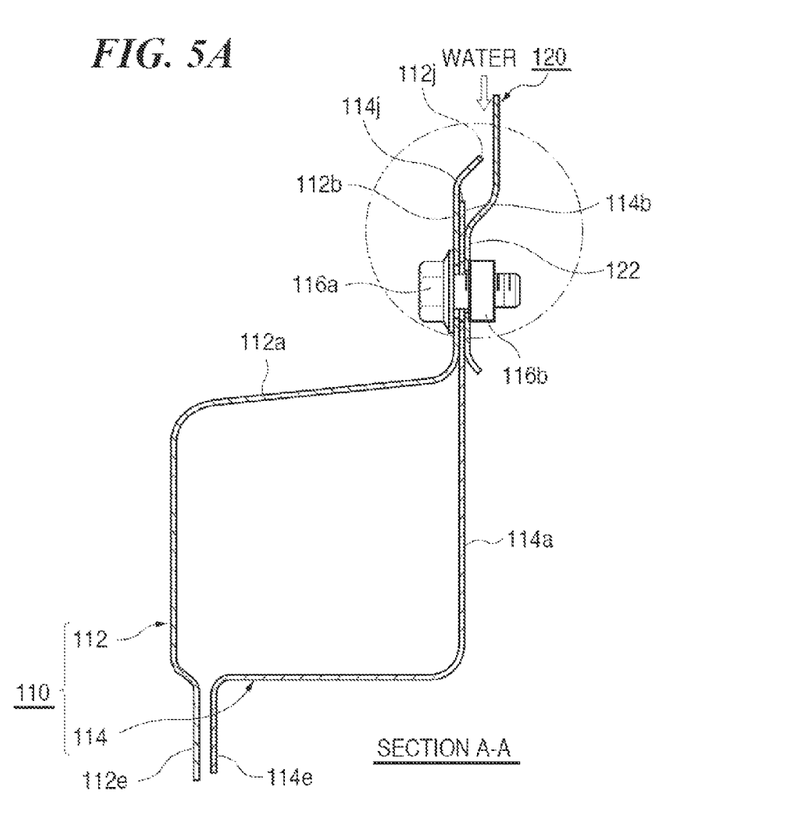
FIGS. 5A, 5B and 5C are cross sectional diagrams of FIG. 4A.
Figure 5B:
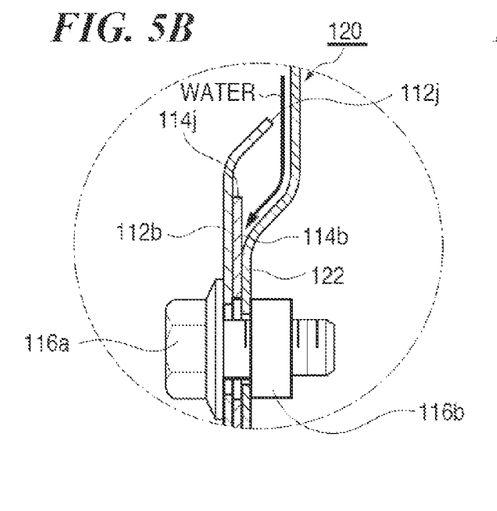
Figure 5C:
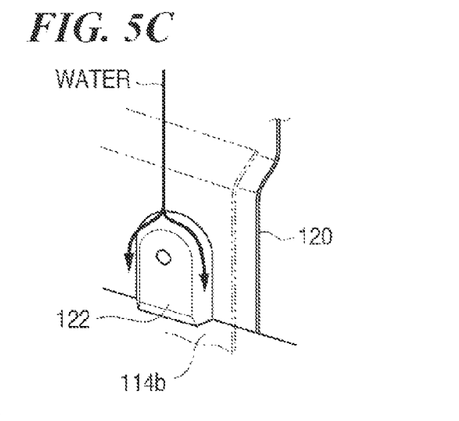

FIGS. 5A, 5B and 5C are cross sectional diagrams of FIG. 4A. FIG. 5A is a cross section of the line A-A in FIG. 4A, FIG. 5B is an inside circle expanded view of FIG. 5A, FIG. 5C is a perspective view of the seat part 122 in FIG. 5B. As is shown in FIG. 5A, when the front lower cross member 110 and the hood lock brace 120 are joined together, the uppermost part of the front plate 112 and the back plate 114, that is, the upper end surfaces 112j and 114j of the joining parts 112b and 114b are separated from the hood lock brace 120. In addition, the seat part 122 is arranged in a lower position than the upper end surface 114j of the joining part 114b of the back plate 114. That is, the upper end surface 112j of the front plate 112 and the upper end surface 114j of the back plate 114 (upper end part of the front lower cross member 110) do not contact with the seat part 122 of the hood lock brace 120.

With the structure described above, the water transferred via the hood lock brace 120 as is shown in FIG. 5B does not reach the upper end surface 112j and 114j, that is, the water reaches the seat part 122 without touching the upper end surface 112j and 114j. Therefore, there is no accumulation of water on the upper end surfaces 112j and 114j and it is possible to control the formation of rust on the upper end surface 112j and 114j. In addition, because water does not accumulate on the upper end surface 112j and 114j, it is possible to prevent water from entering the space within the front lower cross member 110 from between the upper end surface 112j and 114j, and reduce the formation of rust within the front lower cross member 110.

In addition, a gap is formed between the hood lock brace 120 and the joining part 114b of the back plate 114 (front lower cross member) in the periphery of the seat part 122 by the expansion of the seat part 122 as is shown in FIG. 5C. In this way, because the water which reaches the seat part 122 flows downwards via this gap on both sides, it is possible to accelerate drainage in the vicinity of the joining part between the front lower cross member 110 and the hood lock brace 120.

In the present embodiment, the joining part 112b of the front plate 112 extends upwards further than the joining part 114b (upper end) of the back plate 114, and curves towards the rear at the upper end (see FIGS. 5A and 5b). Therefore, the end tip of the joining part 112b (front plate 112) is positioned above the matching surface of the joining parts 112b and 114b. In this way, it is possible to prevent water from entering the interior of the vehicle body from the matching surface. In addition, because the upper end of the joining part 114b is covered by the joining part 112b with this structure, even if formation of rust within the joining part 112b occurs, it is difficult to see the rust and therefore it is possible to maintain the external appearance of the vehicle.

In the case where the joining part 112b curves towards the rear at the upper end as described above, it is preferred that the angle of the curve be less than 90 degrees. This is because when the angle of the curve is 90 degrees, the upper end of the joining part 112b contacts the hood lock brace 120, and the water transferred by the hood lock brace 120 may flow to the front plate 112. Here, supposing that the length of the joining part 112b is reduced and the angle of the curve is 90 degrees, the upper end of the joining part 112b does not contact the hood lock brace 120. However, in this case, the length of the joining part 112b when it is pivotally supported by a process machine may be insufficient leading to a drop in stability. Thus, if the angle of the curve is made less than 90 degrees as in the present embodiment, the joining part 112b and the hood lock brace 120 do not contact and it is possible to favorably secure stability when pivotally supported by a process machine.

Furthermore, the shape of the joining part 112b of the front plate 112 is not limited to the shape shown in FIGS. 5A, 5B and 5C. Therefore, in the case where it is difficult for water to enter from the matching surface between the joining part 112b and 114b for example, the joining part 112b may extend unchanged upwards without curving to the rear at the upper end. In addition, for example, in the case where the back plate 114 is comprised from a material which does not rust easily, the upper end of the joining part 112b may be positioned lower than the upper end of the joining part 114b.

In addition, in the present embodiment, the lower flange 112e of the front plate extends 112 further downwards than the lower flange 114e (lower end) of the back plate 114 (see FIG. 5A). In this way, because the interior surface of the lower flange 114e is covered by the lower flange 112e, even in the case where rust is formed, it is difficult to see the rust and therefore it is possible to maintain the external appearance of the vehicle.

Furthermore, the lower end of the hood lock brace 120 in the present embodiment curves towards the rear and is separated from the back plate 114 (see FIG. 5A). In this way, the water transferred by the hood lock brace 120 starts to drip downwards at the lower end which aids drainage and it is possible to prevent rust from forming on the lower end of the hood lock brace 120.

Figures 6A, 6B:
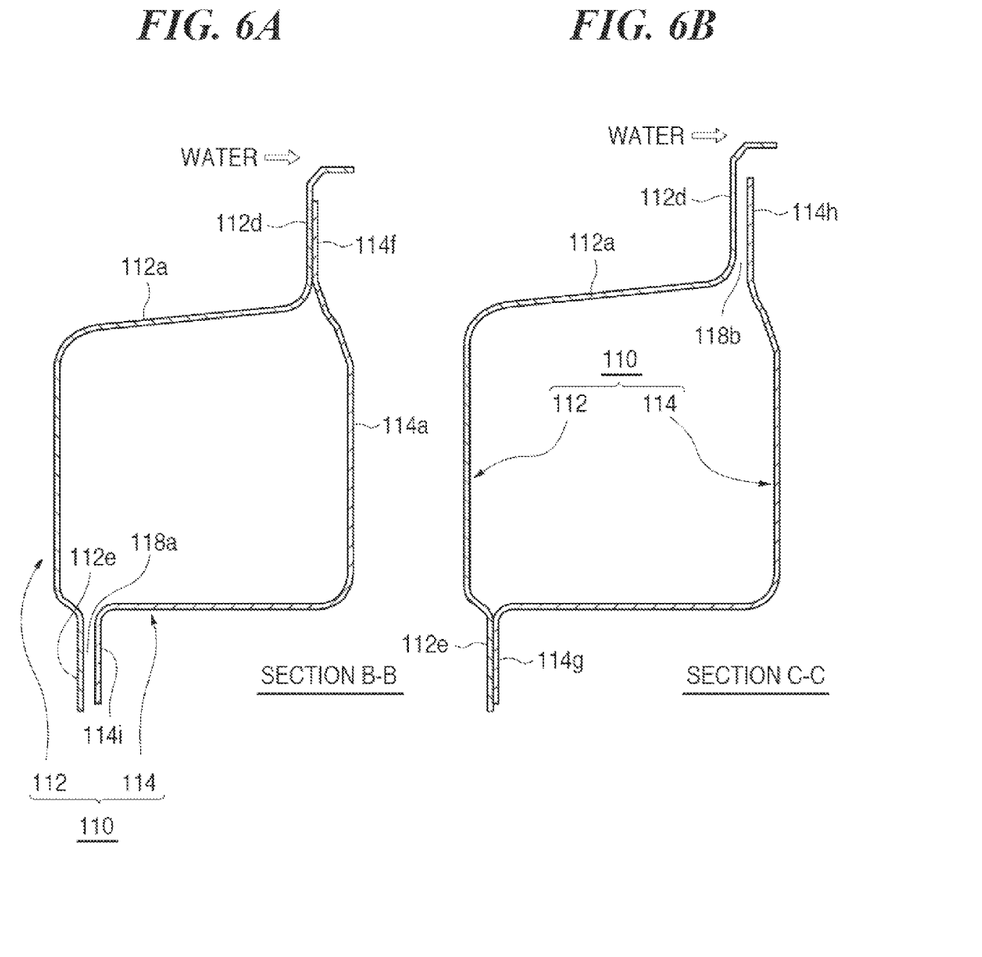
FIGS. 6A and 6B are cross sectional diagrams of FIG. 4B.

FIGS. 6A and 6B are cross sectional diagrams of FIG. 4B. FIG. 6A is a cross sectional diagram of FIG. 4B along the line B-B, FIG. 6B is a cross sectional diagram of FIG. 4B along the line C-C. As described above, the contact part 114f and non-contact part 114h are formed on the upper flange 114d of the back plate 114, and the contact part 114g and non-contact part 114i are formed on the lower flange 114e. In this way, when the front lower cross member 110 is assembled, amount the opposing surfaces of the front plate 112 and the back plate 114, gaps 118a and 118b shown in FIGS. 6A and 6B are formed between the upper flange 112d and the lower flange 112e and the non-contact parts 114h and 114i (that is, the parts other welding or places where other parts are joined).

Specifically, the gap 118a is formed between the lower flange 112e and the non-contact part 114i as is shown in FIG. 6A. In addition, the gap 118b is formed between the upper flange 112d and the non-contact part 114h as is shown in FIG. 6B. In this way, the contact area (contact area between the front plate and the back plate) between the upper flanges 112d and 114d and the lower flanges 112e and 114e is reduced. Supposing that the parts other places where welding takes place are made the contact surface, because it is difficult for water to be discharged in the case where water enters, water accumulates over a long time and rust is easily formed. Thus, as described above, if the gaps 118a and 118b are arranged and the area of the contact surface (contact area) is reduced, it is possible to reduce the area where rust is formed. In addition, because the gap 118a also functions as a drain in the case where water enters the front lower cross member 110, it is possible to improve drainage.

As described above, according to the joining mechanism related to the first embodiment, the upper end surface 112j of the joining part 112b of the front plate 112 and the upper end surface 114j of the joining part 114b of the back plate 114, that is, the upper end surface of the front lower cross member 110 and the hood lock brace 120 do not contact. As a result, the water which falls on the hood lock brace 120 does not reach the upper end surfaces 112j and 114j and water does not accumulate. Therefore, it is possible to reduce the formation of rust on the upper end surfaces 112j and 114j. In addition, because water does not accumulate on the upper end surfaces 112j and 114j, it is possible to prevent water from entering into the front lower cross member 110 and it is possible to reduce the formation of rust on the interior of the front lower cross member 110. Furthermore, by adjusting the end part shape of the front plate 112 or hood lock brace 120 and the shape of the lower and upper flanges of the back plate 114, it is possible to prevent rust from forming on the parts other than upper end surfaces 112j and 114j.

As is explained in the first embodiment above, in order to reduce the formation of rust on the upper end surfaces 112j and 114j of the front plate 112 and the back plate 114, it is necessary to prevent water from accumulating on the upper end surfaces 112j and 114j. In addition, in order to prevent water form accumulating on the upper end surfaces 112j and 114j, it is effective if the upper end surfaces are separated from the hood lock brace 120 and in the joining mechanism of the first embodiment, they are separated by arranging a seat part 122 on the hood lock brace 120. In the second embodiment however, a joining mechanism is explained in which it is possible to separate the upper end surfaces 112j and 114j of the front plate 112 and the back plate 114 from the hood lock brace 120 by adjusting the shape of the front lower cross member 110.

Second Embodiment

Figure 7A:
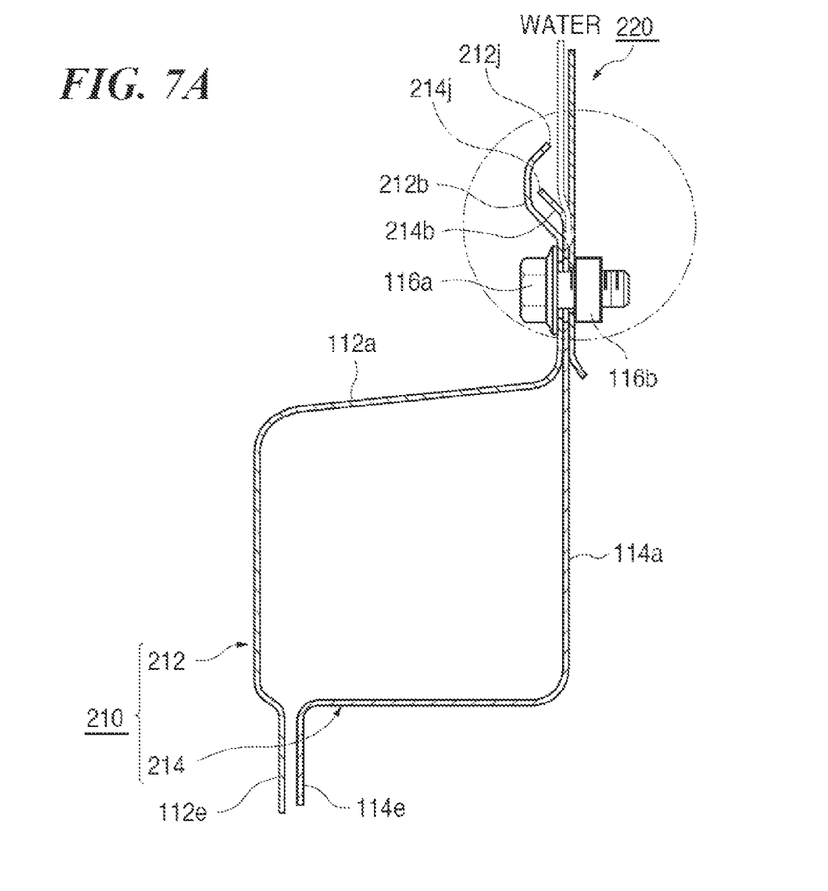
FIGS. 7A and 7B are diagrams which illustrate an approximate structure of a joining mechanism related to a second embodiment.
Figure 7B:
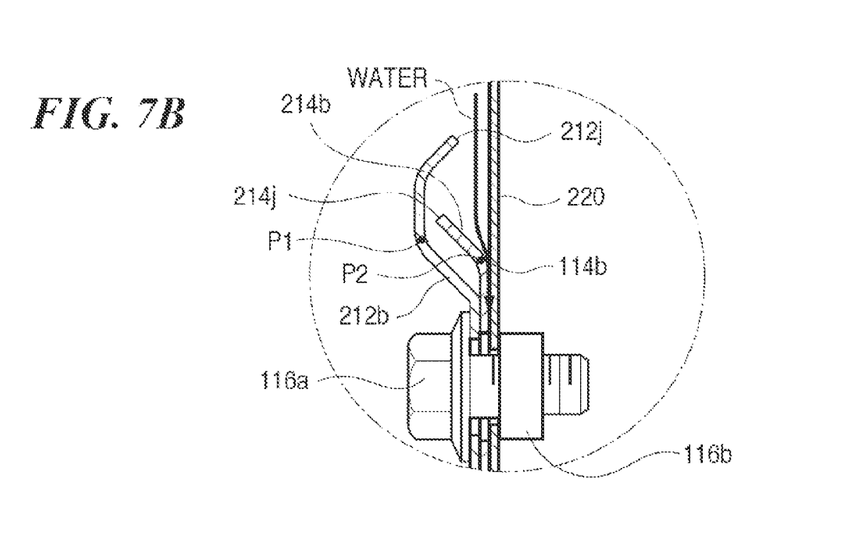

FIGS. 7A and 7B are diagrams which illustrate an approximate structure of a joining mechanism related to a second embodiment. FIG. 7A is a cross sectional diagram of the joining mechanism related to the second embodiment, FIG. 7B is a partial expanded view of FIG. 7A. Furthermore, in the explanation below, the elements which have essentially the same function and structure as structural elements of the joining mechanism in the first embodiment are attached with same reference symbols and overlapping explanations are avoided. In addition, in order to facilitate understanding of the invention, a detailed depiction of parts which are unnecessary for explaining the joining mechanism related to the present embodiment are omitted from FIGS. 7A and 7B.

As is shown in FIG. 7A, in the joining mechanism of the second embodiment, the upper end vicinities of a font plate 212 and a back plate 214 of a front lower cross member 210 are fastened to the front side of a hood lock brace 220. In the present embodiment, joining parts 212b and 214b of the front plate 212 and the back plate 214 curve towards the front further upwards than a joining part with the hood lock brace 220 (joining part in the hood lock brace 220, specifically a bolt hole).

Specifically, as is shown in FIG. 7B, the joining part 212b curves to the front at P1 upwards further than the joining part with the hood lock brace 220 and the joining part 214b curves to the front at P2 upwards further than the joining part with the hood lock brace 220. In this way, the upper end surface 212j of the front plate 212 and the upper end surface 214j of the back plate 214 can be separated form the hood lock brace 220.

As a result, even if a seat part 122 is not arranged on the hood lock brace 220, the water which is transferred by the hood lock brace 220 does not contact the upper end surfaces 212j and 214j, and flows away between the back plate 214 and the hood lock brace 220. Therefore, water does not accumulate on the upper end surfaces 212j and 214j. In this way, it is possible to reduce the formation of rust in the upper end surfaces 212j and 214j, prevent water from entering the space within the front lower cross member 210 and reduce the formation of rust within the front lower cross member 210.

In the present embodiment, the joining part 212b of the front plate 212 extends upwards further than the upper end (upper end surface 214j) of the back plate 214 after curving to the front at P1 and the upper end of the front plate 212 curves towards back side in order to cover the upper end of the back plate 214 at the upper end. In this way, the joining part 212b of the front plate is positioned at the front and top of the matching surface of the joining part 212b of the front plate 212 and the joining part 214b of the back plate 214. Therefore, it is possible to prevent water from entering from the matching surface and even in the case where rust is formed on the interior surface of the joining part 214b of the back plate it is difficult to see the rust and therefore it is possible to maintain the external appearance of the vehicle.

As explained above, even with the joining mechanism related to the second embodiment, it is possible to separate the upper end surface of the front lower cross member 210 and the hood lock brace 220 and prevent the accumulation of water on the upper end surface of the front lower cross member 210. Therefore, it is possible to reduce the formation of rust on the upper end surface and interior of the front lower cross member 210.

Comparative Example

Figures 8A, 8B, 8C:
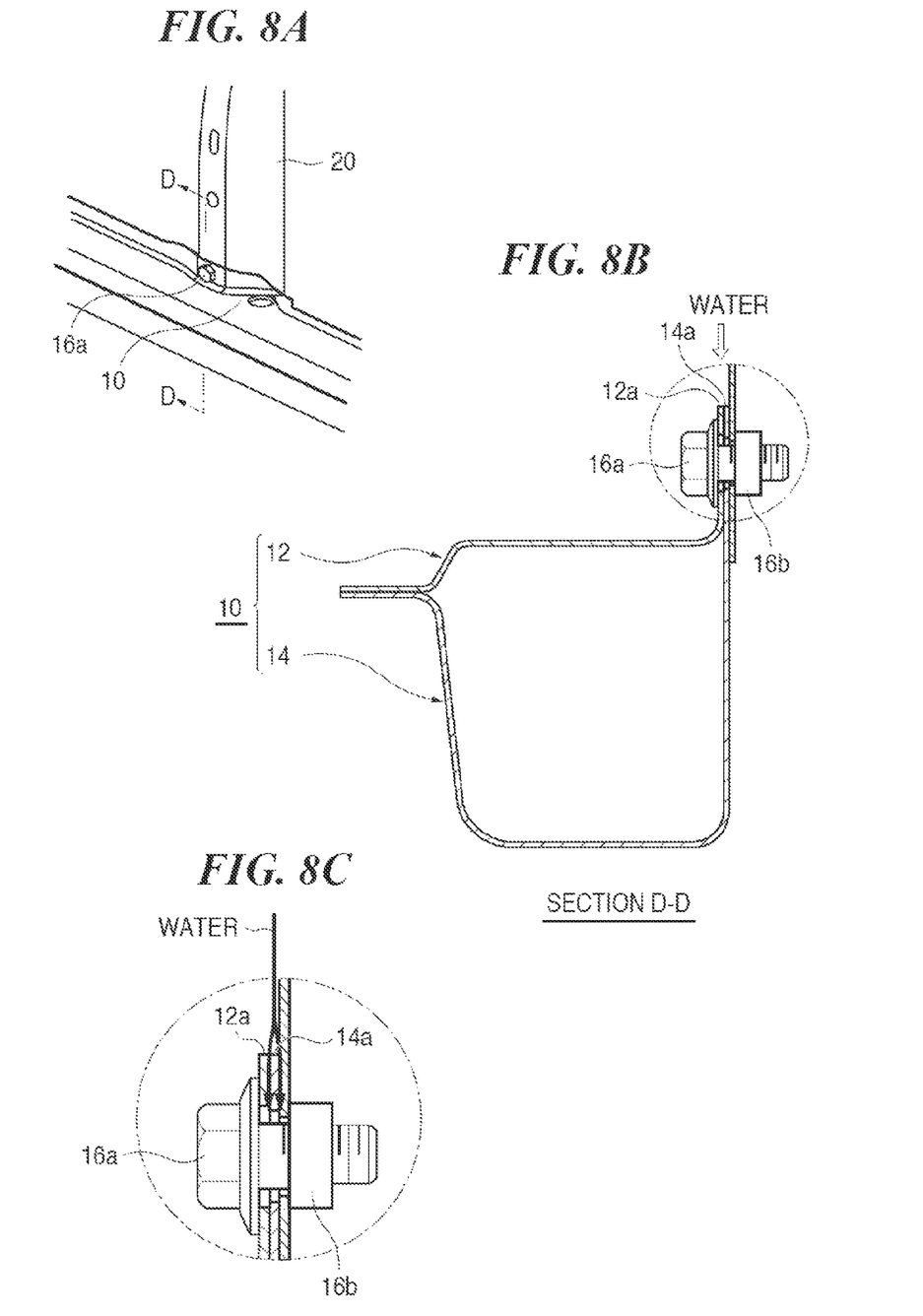
FIGS. 8A, 8B and 8C are diagrams which show an approximate structure of a joining mechanism as a comparative example.

FIGS. 8A, 8B and 8C are diagrams which show an approximate structure of a joining mechanism as a comparative example which compares the first embodiment and the second embodiment of the present invention. FIG. 8A is a partial perspective diagram of the comparative example joining mechanism, FIG. 8B is a cross sectional view of FIG. 8A, FIG. 8C is a partial expanded view of FIG. 8B. As is shown in FIG. 8A, in the comparative example joining mechanism, the upper end vicinity of a front lower cross member 10 is fastened to the front side of a hood lock brace 20 using a bolt 16a and a nut 16b.

As is shown in FIG. 8B, in the comparative example joining mechanism, the upper end of the front lower cross member 10, that is, the upper end of a front plate 12 and a back plate 14 are not separated from the hood lock brace 20. As a result, the upper end of the back plate 14 contacts the hood lock brace 20 and the upper end of the front plate 12 contacts the hood lock brace 20 via the upper end of the back plate 14. In other words, the upper end surface 12a and 14a of the front plate 12 and the back plate 14 are linked with the hood lock brace 20. Therefore, water which is transferred via the hood lock brace accumulates on the upper end surfaces 12a and 14a and rust may be formed there.

In addition, water which accumulates on the upper end surfaces 12a and 14a gradually enters between the hood lock brace 20 and the front lower cross member 10 (front plate 12 and back plate 14) as is shown in FIG. 8C. At this time, water which has entered the matching surface between the back plate 14 and the hood lock brace 20 eventually reaches the lower end of the hood lock brace 20 and is discharged from the matching surface although the matching surface has poor drainage. However, the water which enters the matching surface between the front plate 12 and the back plate 14 flows into the front lower cross member 10. As a result, in the comparative example joining mechanism, rust may be formed not only on the upper end surfaces 12a and 14a but also within the front lower cross member 10.

While the preferred embodiments of the present invention are explained above while referring to the diagrams, the present invention is not limited to these examples. It is clear that a person skilled in the art may make changes and modifications without departing from the scope of the appended claims and it is to be understood that such changes are within the technical scope of the present invention.

The present invention can be used in a joining mechanism which joins a front lower cross member arranged on the front part of a vehicle body, with a hood lock brace.

What is claimed is:

1. A joining mechanism comprising:
   a front lower cross member formed from a front plate and a back plate joined together to form a space, said front lower cross member extending in a vehicle width direction lower than a hood lock member which supports a bottom part of a vicinity of a front end of an engine hood; and
   a hood lock brace which extends in a vehicle height direction between the hood lock member and said front lower cross member, said hood lock brace joining the hood lock member and said front lower cross member;
   wherein upper end vicinities of the front plate and the back plate of said front lower cross member are fastened to the front side of said hood lock brace, and an upper end of the front plate and an upper end of the back plate are separated from said hood lock brace.

2. The joining mechanism according to claim 1, wherein said hood lock brace is provided with a seat part which expands towards said front lower cross member and is joined to said front lower cross member, the seat part being positioned lower than the upper end of the back plate.

3. The joining mechanism according to claim 2, wherein the front plate extends upwards further than the upper end of the back plate and the upper end of the front plate curves backwards.

4. The joining mechanism according to claim 1, wherein the front plate and the back plate curve forward at a position above a joining part with said hood lock brace.

5. The joining mechanism according to claim 4, wherein the front plate extends upwards further than the upper end of the back plate and the upper end of the front plate curves backwards in order to cover the upper end of the back plate.

6. The joining mechanism according to claim 1, wherein a lower end of said hood lock brace curves backwards in order to be separated from the back plate.

7. The joining mechanism according to claim 1, wherein a gap part is arranged on opposing surfaces of the front plate and the back plate at a part other than those welded or fastened.

8. The joining mechanism according to claim 1, wherein the front plate extends downwards further than the lower end of the back plate.

9. The joining mechanism according to claim 2, wherein the front plate extends downwards further than the lower end of the back plate.

* * * * *